United States Patent [19]
Baugh et al.

[11] Patent Number: 4,693,498
[45] Date of Patent: Sep. 15, 1987

[54] ANTI-ROTATION TUBULAR CONNECTION FOR FLOWLINES OR THE LIKE

[75] Inventors: Benton F. Baugh, Houston; Narayana N. Panicker, Dallas, both of Tex.

[73] Assignee: Mobil Oil Corporation, New York, N.Y.

[21] Appl. No.: 856,308

[22] Filed: Apr. 28, 1986

[51] Int. Cl.⁴ ............................................. F16L 21/08
[52] U.S. Cl. ...................................... 285/39; 411/204; 411/208; 269/25; 285/85; 285/86; 285/92; 285/333; 285/369; 285/319
[58] Field of Search ...................... 285/39, 81, 84, 85, 285/86, 87, 88, 89, 92, 333, 334, 912, 319, 920, 369; 411/491, 492, 495, 496, 497, 204, 208, 216, 217, 221, 293; 81/3.7, 3.56, 44, 488, 485; 269/20, 25; 254/93 R

[56] References Cited

U.S. PATENT DOCUMENTS

| | | | |
|---|---|---|---|
| 439,981 | 11/1890 | Stewart | 285/84 |
| 620,821 | 3/1899 | Abbey | 285/88 |
| 1,195,350 | 8/1916 | Gilman | 285/81 |
| 1,417,411 | 5/1922 | Reynolds | 285/85 |
| 2,244,124 | 6/1941 | Shemeley | 285/37 |
| 2,485,763 | 10/1949 | Moon | 285/86 |
| 2,651,957 | 9/1953 | Phillips | 81/3.56 |
| 3,015,500 | 1/1962 | Barnett | 285/81 |
| 3,608,933 | 9/1971 | Lee | 285/39 |
| 3,622,185 | 11/1971 | Rosan | 411/217 |
| 3,702,707 | 11/1972 | Rosan | 285/92 |
| 3,920,232 | 11/1975 | Clark | 269/25 |
| 4,018,110 | 4/1977 | Spriggs | 81/3.56 |
| 4,182,584 | 1/1980 | Panicker | 405/195 |
| 4,185,856 | 1/1980 | McCaskill | 285/920 |
| 4,367,055 | 1/1983 | Gentry | 405/169 |
| 4,400,109 | 8/1983 | Gentry | 166/340 |
| 4,423,984 | 1/1984 | Panicker | 405/195 |
| 4,429,902 | 2/1984 | Cowan | 285/85 |
| 4,444,421 | 4/1984 | Ahlstone | 285/86 |
| 4,488,740 | 12/1984 | Baugh et al. | 285/93 |
| 4,553,587 | 11/1985 | Traylor | 285/86 |

FOREIGN PATENT DOCUMENTS

| | | | |
|---|---|---|---|
| 577404 | 6/1959 | Canada | 285/86 |
| 1173076 | 8/1984 | Canada | 285/39 |
| 352880 | 12/1937 | Italy | 285/86 |
| 2004964 | 4/1979 | United Kingdom | 269/25 |

Primary Examiner—Cornelius J. Husar
Assistant Examiner—Eric K. Nicholson
Attorney, Agent, or Firm—Alexander J. McKillop; Michael G. Gilman; Charles J. Speciale

[57] ABSTRACT

An anti-rotational joint for connecting sections of conduits together to form a flowline or the like wherein the joint includes a means that prevents the joint from accidentally unscrewing after it is made up to its desired torque.

5 Claims, 7 Drawing Figures

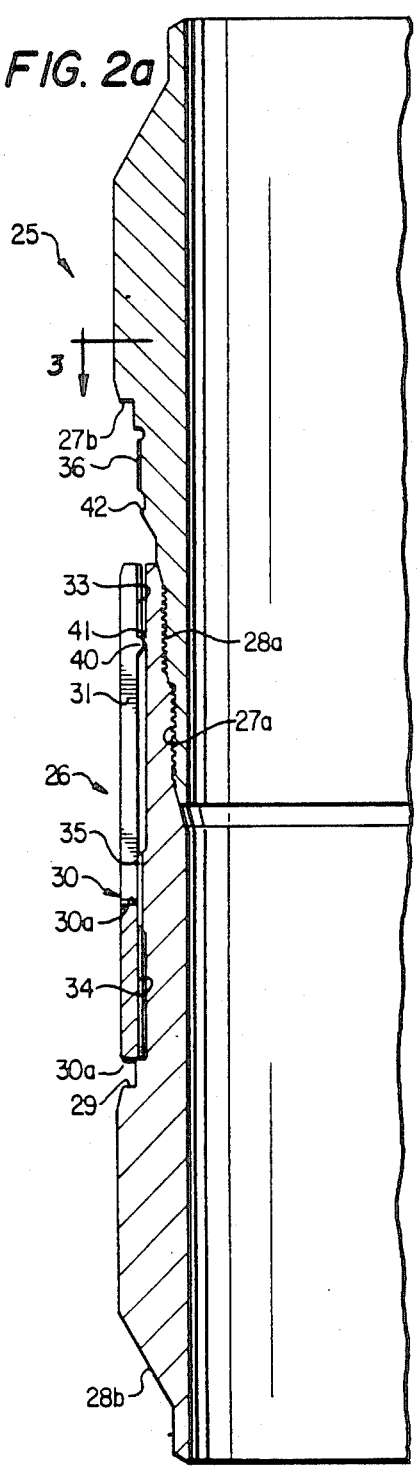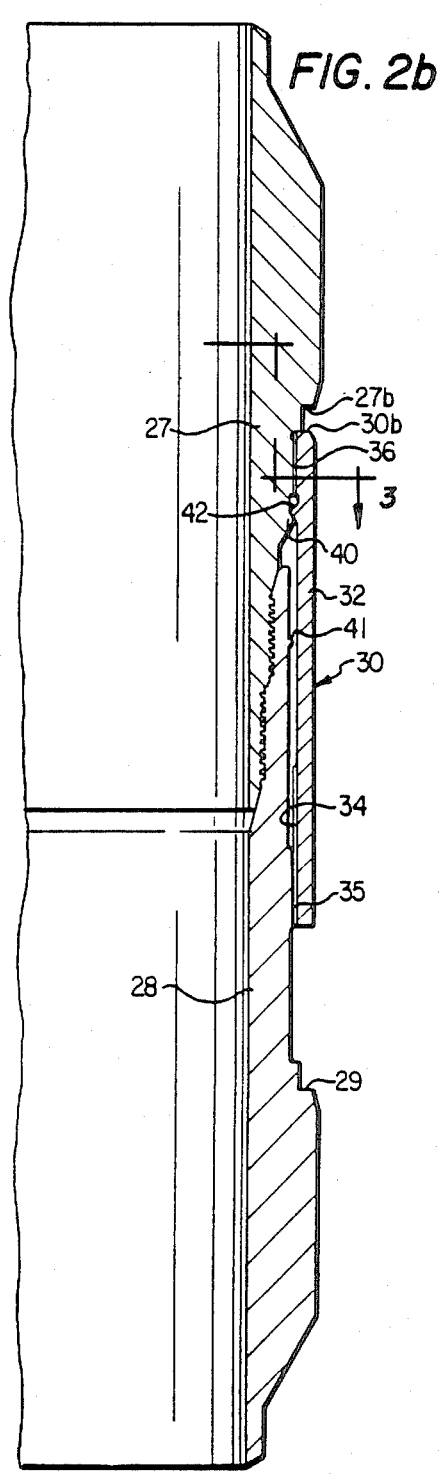

ANTI-ROTATION TUBULAR CONNECTION FOR FLOWLINES OR THE LIKE

TECHNICAL FIELD

The present invention relates to a means for preventing the accidental unthreading of a threaded tubular connection and more particularly relates to an anti-rotational threaded, tubular joint for connecting sections of tubular conduits together which includes an anti-rotational means which locks the joint in its made-up torqued position.

BACKGROUND ART

Tubular joints are routinely used in the oil and gas industry to connect sections of conduits together to form various types of flow strings; e.g. tubing strings, casing strings, drill strings, etc. Typical of such a joint is one which is comprised of a pin member (male threads) which is welded or otherwise affixed to one end of a conduit section and a box member (female threads) similarly affixed to the other end thereof. The pin member of one section is threaded into the box member on another section and is tightened to a prescribed torque to form a fluid-tight connection between the conduits.

Unfortunately, when a threaded, shouldered connection such as a standard tubular joint is tightly made up, there is an inherent tendency for the connection to anti-rotate and loosen itself. This tendency is a function of the lead angle of the thread and is normally counteracted by the frictional forces between both the treads and the abutting shoulders of the joint. These frictional forces are considered to result from the microscopic engagement of peaks and valleys of one surface against the peaks and valleys of the other and are normally adequate to prevent unthreading of the connection, especially where the string of conduit is used in a static environment, e.g. a well bore. However, where the conduit string experiences dynamic forces over a prolonged period, a joint may work back and forth to thereby unthread and loosen to the point where an undesirable, if not disastrous, leak may occur.

For example, a critical consideration in the production of fluid hydrocarbons from marine deposits lies in providing a fluid communication system from the marine bottom to the surface after production has been established. Such a system, commonly called a production riser, usually includes multiple conduits strings through which various produced fluids are transported to and from the surface and include oil and gas production lines, service, and hydraulic control lines.

When these conduit strings which extend vertically through several hundreds of feet of water are subjected to substantial yaw moments (i.e. moments at 90° to conduit centerline), microscopic separation and slippage between the frictional surfaces of the joint can occur. As this slippage is repeated over and over again for prolonged periods of operation, eventually the joint can be loosened by left-hand or anti-rotational moments well below the original make-up torque. Further, the joints in the tubular strings also are subjected to substantial cyclic tensile, axial moments and twisting moments due to the movements in the water body in which the conduit strings are positioned; any of which may result in fully reversing forces which tend to loosen or unscrew the joint.

As an example, a compliant marine riser having a rigid section 2200 feet long and having 13 separate conduit strings (each made up of standard 45 foot lengths of conduit) will have a total of 637 tubular joint connections. If the probability of only one of these joints unthreading can be assumed to one in 100 over a typical 20 year expected life of the riser, the actual probability that at least one joint will so fail is calculated as a 99.8% certainty. It can be seen that this high probability of failure and the resulting likelihood of a leak developing therefrom during the expected life of riser, dictate that steps must be taken to insure that a joint used in such enviroments can not be accidentaly unthreaded even when exposed to hostile conditions.

DISCLOSURE OF THE INVENTION

The present invention provides an anti-rotational joint for connecting sections of conduits together to form a flowline or the like wherein the joint includes a means that prevents the joint from accidentally unscrewing after it is made up to its desired torque. More specifically, the present tubular joint is comprised of a pin member and a box member which are adapted to be connected to respective ends of a section of conduit. The pin member of one section is threaded into the box member of another.

A lock sleeve is splined onto the box member which allows longitudinal movement of the sleeve on the box member from an unlocked position to a locked position while preventing relative rotational movement between the sleeve and box member. The upper portion of the sleeve is formed of resilient fingers which carry ratchet teeth which, in turn, cooperate with ratchet teeth on the pin member when the sleeve is in a locked position. The ratchet means allows rotation of the pin member in the direction required to tighten the threads but prevents anti-rotation in the opposite direction. The present invention also provides a special tool for moving the sleeve between the unlocked and locked positions.

The tubular joint of the present invention is simple and fast to operate and is easily and quickly releaseable to allow break-out of the joints, if and when a need arises; this being an important consideration in the enviroments in which the joint is normally be used.

BRIEF DESCRIPTION OF THE DRAWINGS

The actual construction, operation, and apparent advantages of the present invention will be better understood by referring to the drawings in which like numerals identify like parts and in which:

FIG. 2A is a sectional view of the present anti-rotational tubular joint in an unlocked position;

FIG. 2B is a sectional view of the anti-rotational tubular joint of FIG. 2A in a locked position;

BEST MODE FOR CARRYING OUT THE INVENTION

Figure 1:
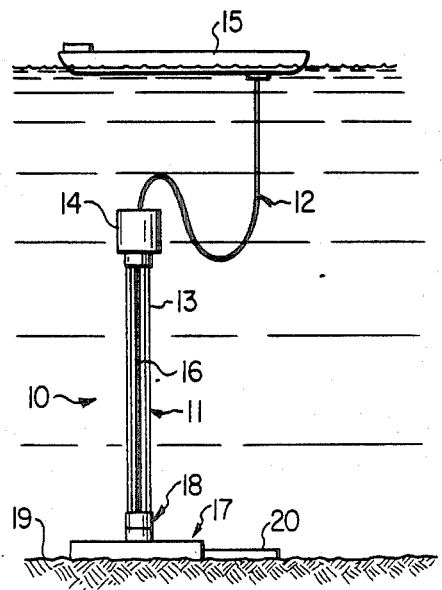
FIG. 1 is a simplified view of a marine riser in which the present invention may be used.
Figure 4:
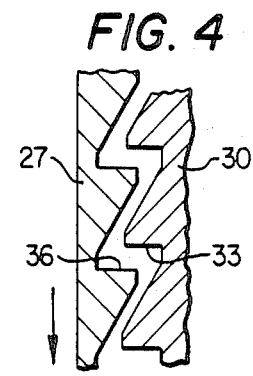
FIG. 4 is an enlarged view of the cooperating ratchet teeth of the present anti-rotational tubular joint.

To better understand the present invention, a brief description of a typical environment in which the flowline connector of the present invention is likely to find widespread use will first be set forth. Referring more particularly to the drawings, FIG. 1 discloses a typical compliant marine riser system 10 in an operable position at an offshore location. Riser system 10 is comprised of a lower rigid section 11 and an upper flexible section 12. Flexible section 12 is comprised of one or more flexible conduits which connect to respective conduit strings or flowlines 13 on rigid section 11 and which extend from buoy 14 to the surface of the water where they are connected to floating facility 15.

Structural core (i.e. rigid conduit 16) of rigid section 11 is affixed by connector 18 to base 17 which, in turn, is preset on marine bottom 19. Fluids produced from a subsea well or wells are flowed to base 17 through submerged flowline 20 for productiom to the surface through riser 10. Examples of such compliant marine riser systems are disclosed and discussed in U.S. Pat. Nos. 4,182,584; 4,367,055; 4,400,109; and 4,423,984; and in paper OTC 4512, "Deepwater Production Riser", Panicker and Yancey, presented at the 15th annual Offshore Technology Conference, Houston, Tex., May 2-5, 1983.

Conduit strings 13 are made of sections of conduit (e.g. 45 foot lengths) which are normally coupled together by standard tubular joints. As will be understood in the art, the individual strings 13 are made up at the surface by lowering a first section, threading another section therein, torquing up the connection, lowering the coupled sections, reading another section thereto, and so on until the desired length of a string is fully assembled. The assembled string is then lowered and connected to base 17 as a unit.

As explained above, tightened, threaded joints in each string 13 have a tendency to anti-rotate to loosen the connection, especially when string 13 is subjected to the various forces applied by the body of water in which riser 10 is positioned. As used throughout the present specification and claims, the term "anti-rotational" means rotation in the direction opposite to the direction of rotation for tightening the threaded connection.

Figure 3:
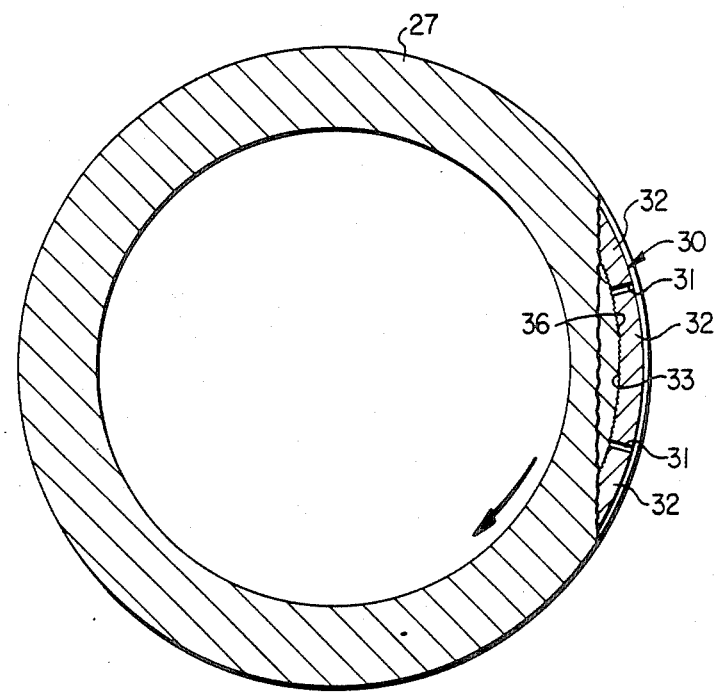
FIG. 3 is a sectional view taken along line 3—3 of FIGS. 2A and 2B.

Turning now to FIGS. 2 and 3, in accordance with the present invention, a tubular joint 25 is provided for use in connecting sections of a tubular string, such as 13, which includes a anti-rotational means 26 for locking joint 25 in an assembled, torqued position to thereby prevent the accidental unthreading of same.

Joint 25 is comprised of pin member 27 having male threads 27a and a box member 28 having female threads 28a. As will be understood in the art, pin member 27 is to be welded or otherwise affixed to one end of a conduit section (not shown) and box member 28 is to be likewise secured to the other end. Pin member 27 of one conduit section is then threaded into box member 28 of an adjacent section to form a connection therebetween.

Anti-rotational means 26 is comprised of lock sleeve 30 which is mounted for longitudinal movement on box member 28 (FIG. 2A). Sleeve 30 is a cylinder having its upper portion sawcut at radial intervals from the top thereof downward to point 30a (FIG. 2A) to provide longitudinal slots 31 (FIGS. 2A and 3), which, in turn, define a plurality of relative resilient fingers 32. The upper, inner arcuate surfaces of each finger 32 has a plurality of ratchet teeth 33 formed thereon. The lower portion of sleeve 30 (below 30a) is uncut and has a plurality of splines 34 on its inner, annular surface which cooperate with splines 35 on box member 28 to allow longitudinal movement while preventing relative rotational movement between sleeve 30 and box member 28. A plurality of ratchet teeth 36 (FIGS. 2A, 2B, 3 and 4) are provided on the outer, annular surface of pin member 27 which cooperate with ratchet teeth 33 on sleeve 30 when sleeve 30 is in an operable or locked position (FIG. 2B) as will be explained in detail below. Now having described the structure involved, a typical assembly operation of a conduit string 13 utilizing the present invention will be disclosed.

Pin members 27 and box members 28 are affixed to individual sections of conduit in accordance with known practices. The shoulder 28b of box member 28 is landed in an standard-type pipe handling elevator (not shown) and the thread protector (not shown), if any, is removed from female threads 28a of box member 28. Using a second set of elevators, a second section of conduit is picked up and pin member 27 is aligned with box member 28. Thread and ratchet protectors (not shown), if any, are removed from male threads 27a and ratchet teeth, respectively. As will be understood in the art, thread protectiors are routinely used in this art to protect all threads until time for use.

Pin member 27 is then lowered into box member 28 and is threaded therein until the connection is "hand tight". Lock sleeve 30 is then moved upward from its unlocked position shown in FIG. 2A to its locked position shown in FIG. 2B. Due to slots 31 in upper sleeve 30, fingers 32 have sufficient resiliency and flexibility to allow annular detent ring 40 on the inner surfaces thereof to be cammed over shoulder 41, (which originally holds ring 30 in an unlocked position) and over locking shoulder 42 on pin member 27 to thereby lock sleeve 30 in its locked position (FIG. 2B). In this locked position, ratchet teeth 33 are brought into engagement with ratchet teeth 36 on pin member 27. It can be seen from FIG. 4 that the respective teeth are directed to allow rotational movement of pin member 27 in a relative right-hand direction with respect to sleeve 30 but prevents left-hand or anti-rotational movement therebetween.

The joint 25 is then tightened to the minimum torque specified for that particular joint. As this final tightening is being effected, it can be seen that sleeve 30 will be held stationary by interlocking splines 34, 35 while the flexibility of fingers 32 allow ratchet teeth 33 on sleeve 30 to ride up over cooperating teeth 36 to allow pin member 27 to rotate in a right-hand or tigtening direction. When the minimum torque has been reached, rotation of pin 27 is continued only until the ratchet profile "clicks" over one additional tooth. This additional rotation should always be very small, (e.g. 0.13 inch or less of circumferential movement for typically sized conduits), to be sure that the maximum torque for the joint is not exceeded.

The pin member 27 is then slightly rotated in the left-hand or anti-rotational direction to insure that teeth 36 are fully mated with teeth 33 of the ratchet means. The joint 25 is now locked against the maximum expected torque in both the right and left hand directions. To unthread joint 25, if the need should arise, it is only necessary to move sleeve 30 downward to its original unlocked position. It should be understood that while splines 34 and 35 can take any conventional form which will prevent relative rotational movement between sleeve 30 and box member 28, splines 34, 35 can also have the same profile as ratchet teeth 33 and 36. This allows both the splines and the ratchet teeth to be manufactured with the same broaches thereby simplifying construction. Since the lower portion of sleeve is uncut, it has no resilency or flexibility so the mating teeth of the spline profile can not rotate relative to each other.

Figure 6:
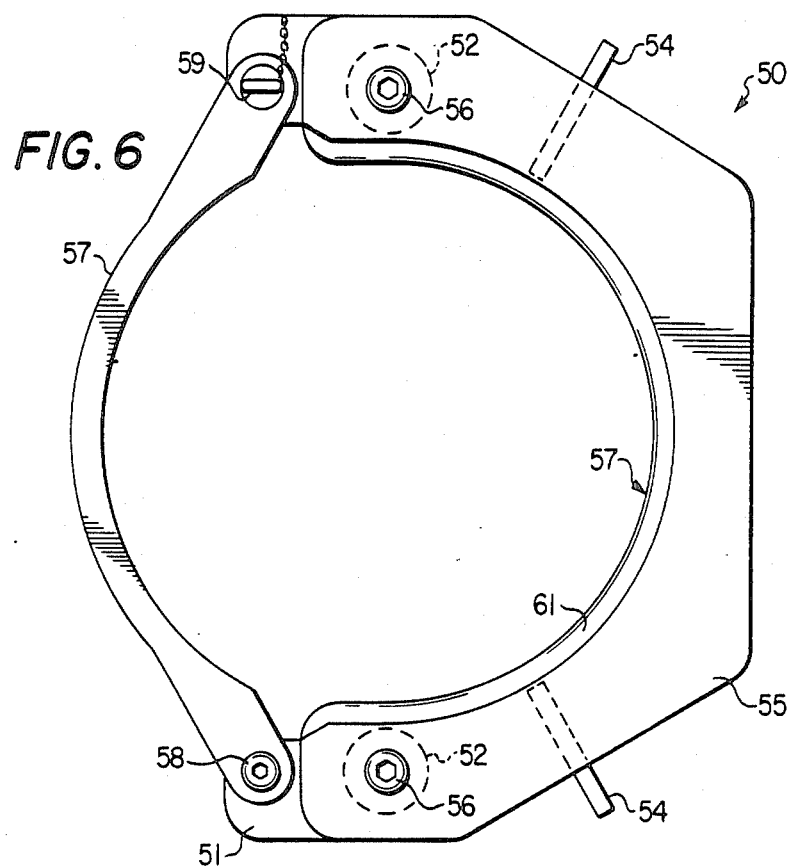
FIG. 6 is a top view of the tool of FIG. 5.
Figure 5:
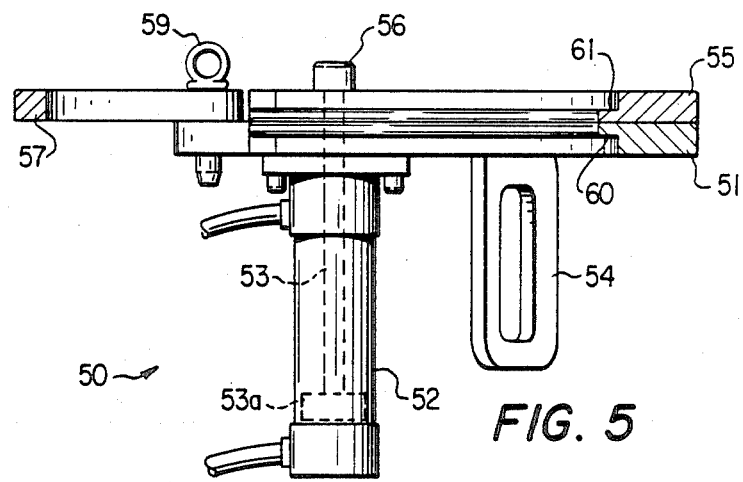
FIG. 5 is an elevational sectional view of a special tool for locking and unlocking said tubular joint of the present invention.

While sleeve 30 can be moved upward or downward by any appropriate means, FIGS. 5 and 6 disclose a special lock sleeve tool 50 preferred for this purpose. Tool 50 is comprised of base plate 51 having two power cylinders 52 (e.g. hydraulic or pneumatic operated) and two handles 54 mounted thereon. The piston rods 53 operated by respective within cylinders 52 pass through respective pistons 53a openings in base plate 55 by nuts 56 or the like. Inner surfaces 57 of both plates are contoured to conform with the outer circumference of box member 28 for a purpose discussed below. Safety latch 57 is pivoted to base plate 51 by pivot 58 and is secured in a latched position by removable pin 59.

In operation, tool 50 is manually positioned via handles 54 so that the abuting annular flanges 60 and 61 on plates 51 and 55 respectively, lie between shoulder 29 on box member 28 and the lower surface 30a of sleeve 30 (FIG. 2A). Safety latch 57 is closed around box member 28 and secured with pin 59 to secure tool 50 in position. Cylinders 52 are then pressured to extend pistons 53a and attached rods 53 in an upward direction. Rods 53 force top plate 55, hence flange 61, upward which, in turn, forces sleeve 30 upward to its unlocked position. Tool 50 is then removed. To unlock sleeve 30, tool 50 is retracted and secured so that flanges 60 and 61 will now lie between shoulder 27b on pin member 27 and the upper surface of 30b of sleeve 30 (FIG. 2B). Now when cylinders 52 are pressured, top plate 55 will be held stationary and base plate 51 and cylinders 52 will move downward to force sleeve 30 downward to its unlocked position.

What is claimed is:

1. An anti-rotational, tubular joint for connecting sections of conduits together, said joint comprising:
    a pin member having male threads thereon adapted to be affixed to an end of a section of conduit;
    a box member having female threads thereon adapted to be affixed to an end of another section of conduit, said female threads cooperate with said male threads to form a connection therebetween when said pin member is rotated in a first direction with respect to said box member;
    a lock sleeve slidably positioned on said box member and movable longitudinally thereon between a unlocked position and a locked position when said pin member is threaded in said box member; said sleeve having longitudinal grooves extending along an upper portion thereof thereby defining a plurality of resilient fingers;
    ratchet teeth on each of said plurality of said fingers; and
    ratchet teeth on said pin member adapted to cooperate with said ratchet teeth on said fingers when said sleeve is in said locked position to allow rotational movement between said lock sleeve and said pin member in a first direction while preventing rotational movement between said lock sleeve and said pin member in an opposite direction; and
    means on said lock sleeve and said box member for allowing longitudinal movement while preventing rotational movement therebetween.

2. The anti-rotational tubular joint of claim 1 including:
    means for latching said sleeve in said locked position.

3. The anti-rotational tubular joint of claim 1 including:
    means for moving said lock sleeve from said unlocked position to said locked position.

4. The anti-rotational tubular joint of claim 3 wherein said means for moving said sleeve comprises:
    a base plate;
    a top plate positioned in abutment with said base plate, said plates being adapted to be positioned between and in contact with a shoulder on said box member and a shoulder on an end of said sleeve;
    means for moving said top plate relative to said base plate to thereby move said sleeve relative to said box member.

5. The anti-rotational tubular joint of claim 4 wherein said means for moving said top plate relative to said base plate comprises:
    at least one power cylinder mounted on said base plate; and
    a piston rod operable by said power cylinder connected to said top plate.

* * * * *

UNITED STATES PATENT AND TRADEMARK OFFICE
CERTIFICATE OF CORRECTION

PATENT NO. : 4,693,498

DATED : September 15, 1987

INVENTOR(S) : Benton F. Baugh and Narayana N. Panicker

It is certified that error appears in the above-identified patent and that said Letters Patent is hereby corrected as shown below:

Column 5, line 12, after "base plate" insert the following

--51 and are connected at their outer ends to top plate--

Column 5, line 28, change "unlocked" to --locked--

Signed and Sealed this

Twelfth Day of July, 1988

Attest:

DONALD J. QUIGG

Attesting Officer

Commissioner of Patents and Trademarks